United States Patent
Marmonier et al.

(10) Patent No.: US 6,771,489 B2
(45) Date of Patent: Aug. 3, 2004

(54) HIGH VOLTAGE HYBRID STATION WITH OPPOSITE BUSBARS AND SHIELDED CUTOFF AND SWITCHING MODULES FOR SAME

(75) Inventors: Jean Marmonier, Saint Aunes (FR); Jean-Paul Audren, Aix les Bains (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/398,559

(22) PCT Filed: Oct. 16, 2001

(86) PCT No.: PCT/FR01/03195

§ 371 (c)(1),
(2), (4) Date: Jul. 24, 2003

(87) PCT Pub. No.: WO02/35671

PCT Pub. Date: May 2, 2002

(65) Prior Publication Data

US 2004/0027791 A1 Feb. 12, 2004

(30) Foreign Application Priority Data

Oct. 20, 2000 (FR) .............................................. 00 13479

(51) Int. Cl.[7] .................................................. H02B 5/00
(52) U.S. Cl. ........................ 361/604; 361/602; 361/611; 361/612; 307/147
(58) Field of Search ................................ 361/601–604, 361/611, 612, 618; 307/142, 147; 200/48 R; 218/75

(56) References Cited

U.S. PATENT DOCUMENTS 3,864,534 A * 2/1975 Goodwin et al. .............. 218/43
5,436,797 A * 7/1995 Marmonier .................. 361/602
5,841,629 A   11/1998 Jeske et al.
6,195,253 B1 * 2/2001 Fahlgren et al. ............ 361/603
6,233,137 B1 * 5/2001 Kolos et al. ................. 361/603
6,538,875 B2 * 3/2003 Marmonier et al. ........ 361/602

FOREIGN PATENT DOCUMENTS

FR        2 695 762 A        3/1994

* cited by examiner

Primary Examiner—Boris Chervinsky
(74) Attorney, Agent, or Firm—Sughrue Mion, PLLC

(57) ABSTRACT

The invention provides a "hybrid" high voltage multiphase distribution substation having one or more sets of busbars including at least one air-insulated set of busbars (10), the substation having feeders (A, B, C, D) for air-insulated lines (21, 22) placed in substantially parallel bays (11, 12) on either side of the set(s) of busbars (10) and including metal-clad breaking and switching modules each formed by metal cladding (2) containing, for each electrical phase passing through a module, breaking and disconnection systems connected to a phase conductor (6) in an insulating gas, an end disconnection system (4A, 4B) being placed at each of the two ends (13, 14) of a module, the substation being characterized in that the feeders are opposite in facing pairs, and in that two opposite feeders (A, B) are electrically interconnected for each electrical phase via a single module (1) when the break systems (3A, 3B, 3C) and the end disconnector systems (4A, 4B) of said module are closed, said end disconnector systems each being connected to a respective feeder (A, B).

21 Claims, 10 Drawing Sheets

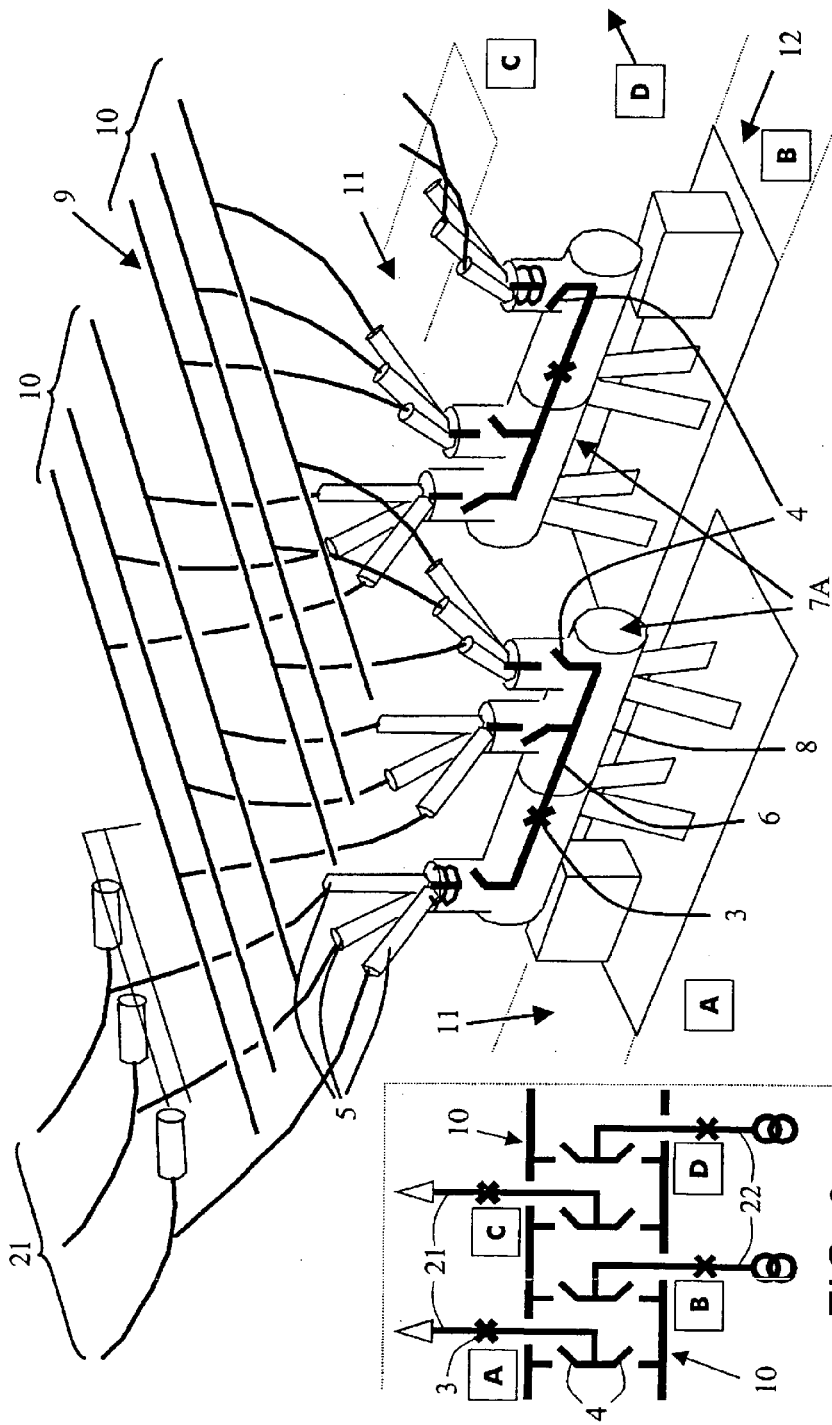
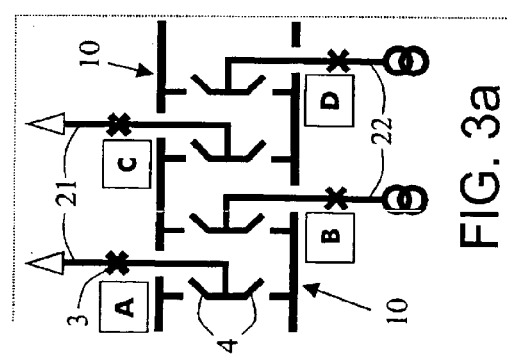
FIG. 3
FIG. 3a

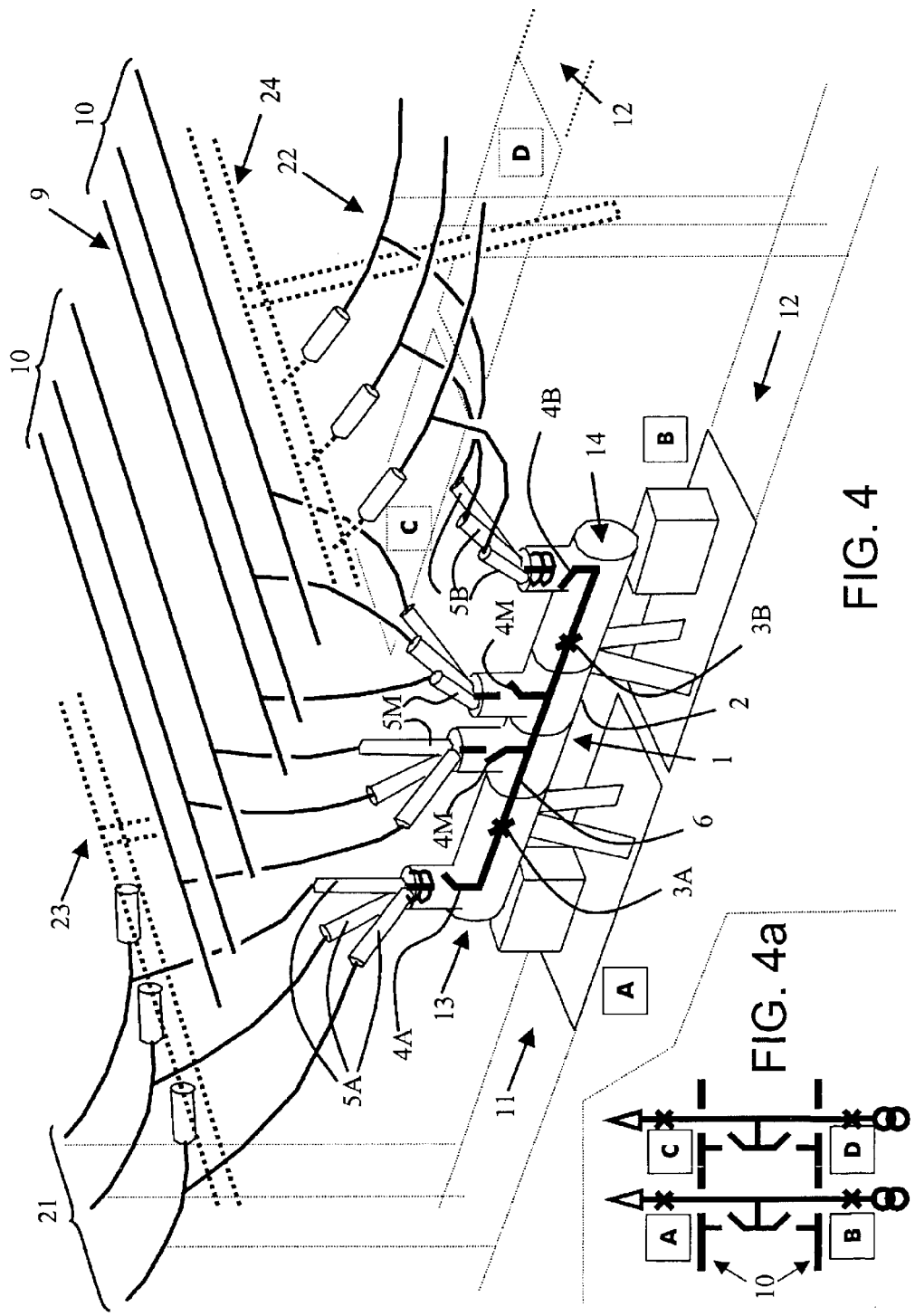

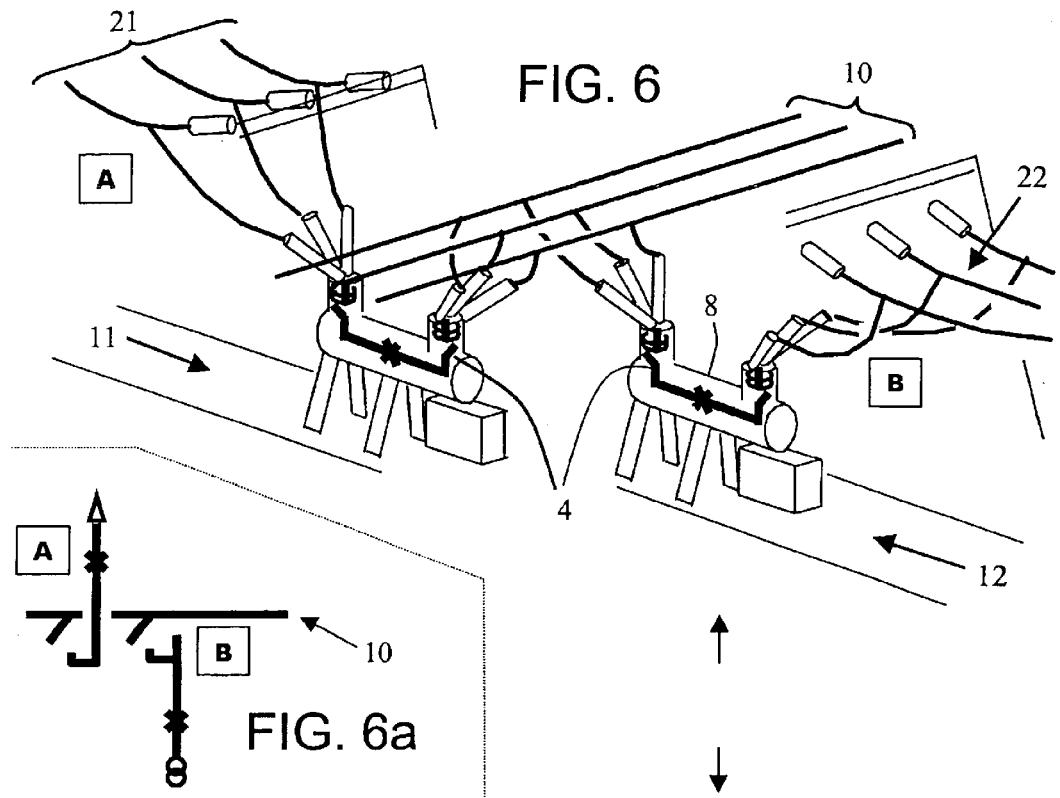
FIG. 6
FIG. 6a
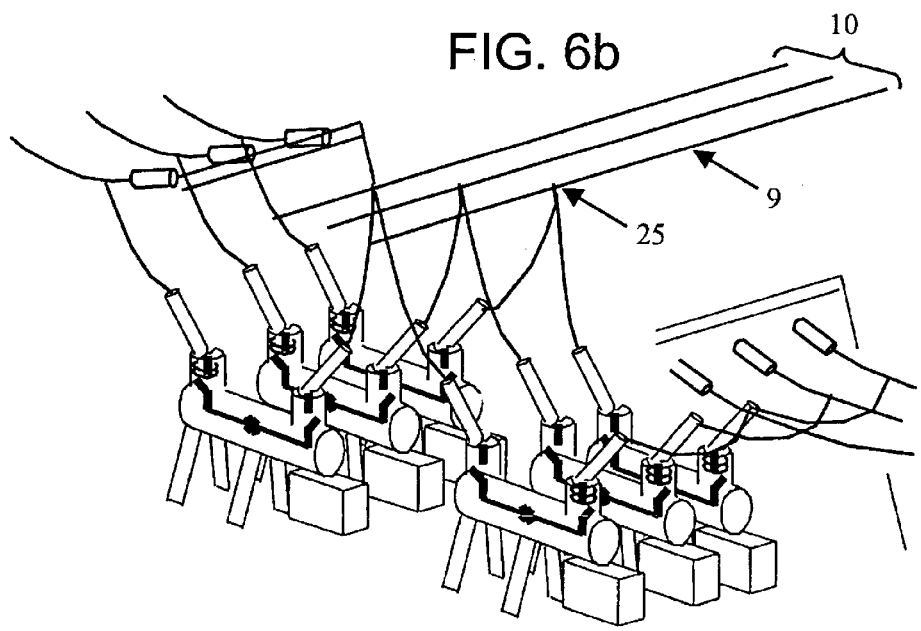
FIG. 6b

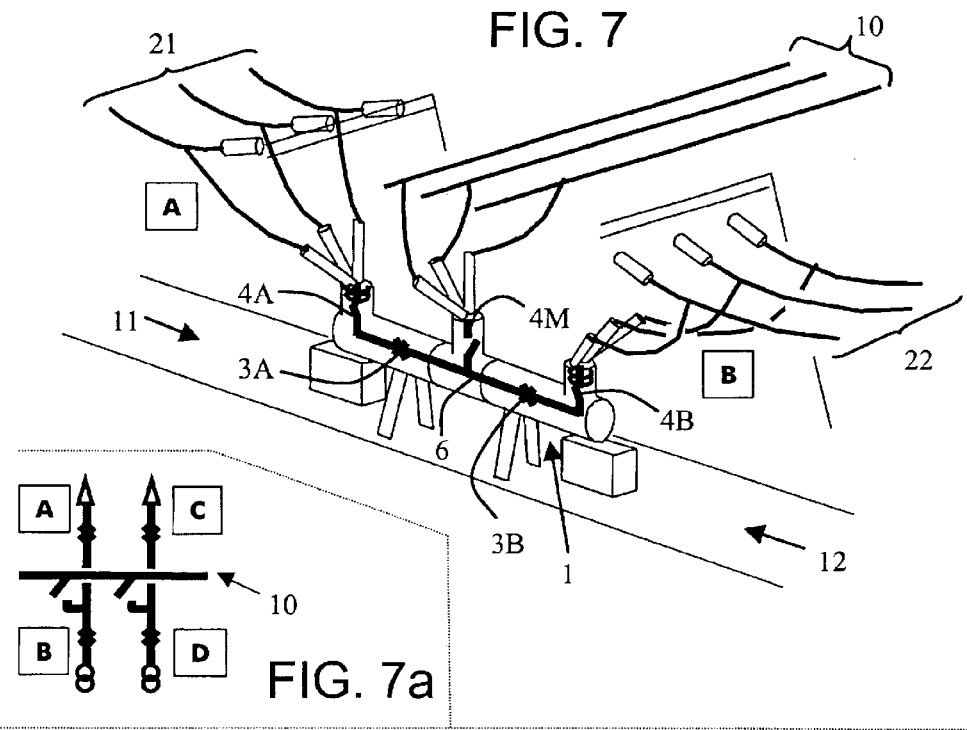
FIG. 7
FIG. 7a
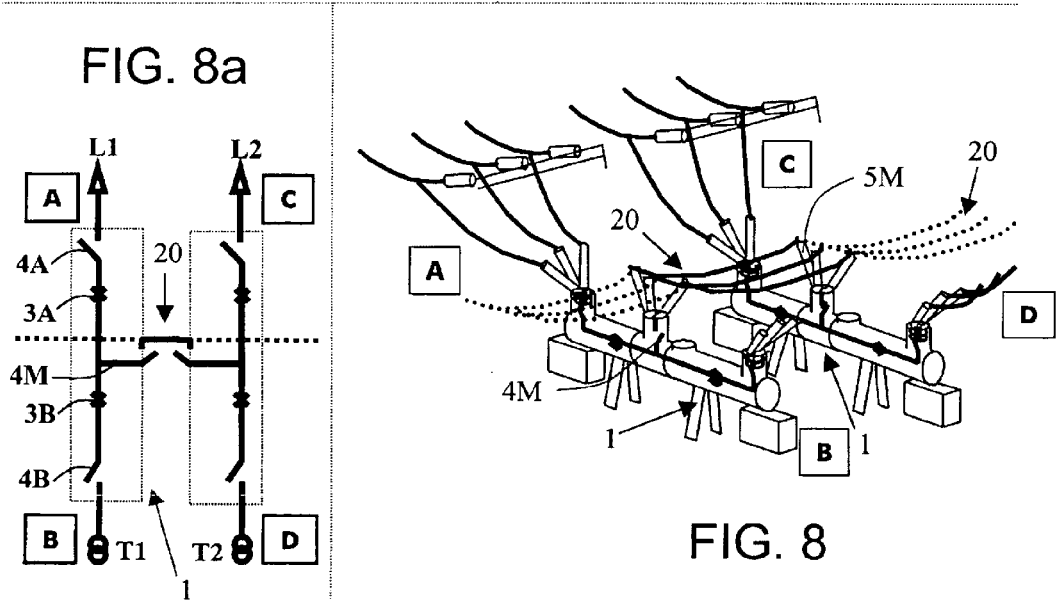
FIG. 8a
FIG. 8

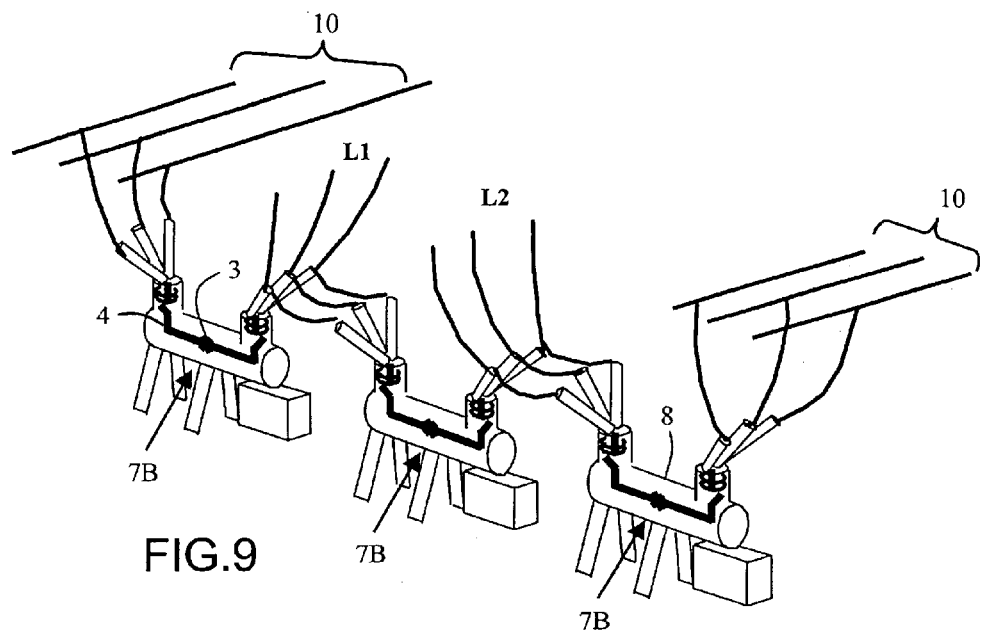
FIG.9
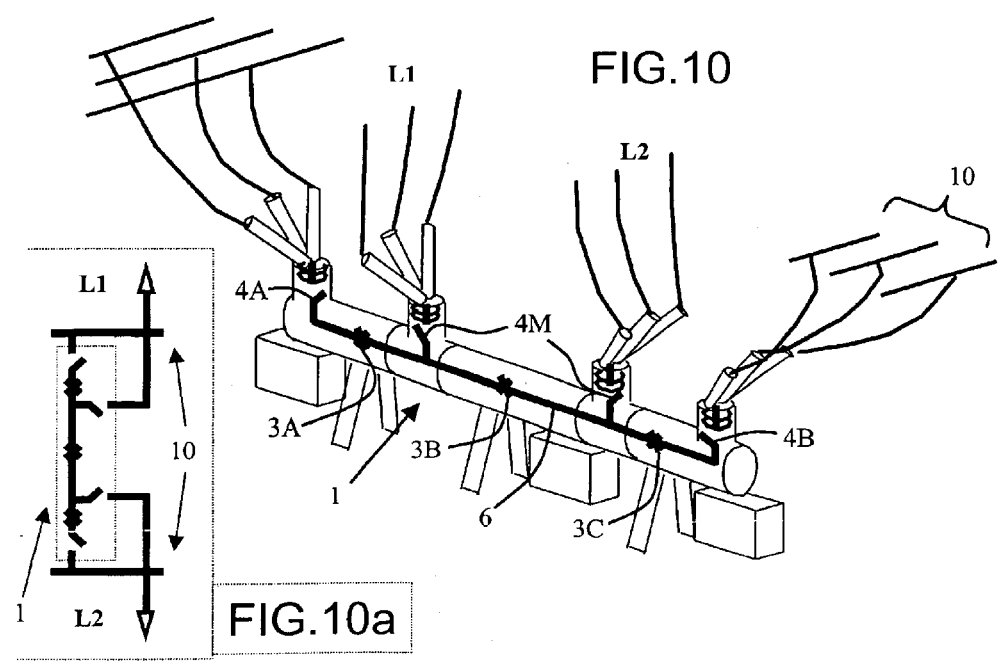
FIG.10
FIG.10a

HIGH VOLTAGE HYBRID STATION WITH OPPOSITE BUSBARS AND SHIELDED CUTOFF AND SWITCHING MODULES FOR SAME

BACKGROUND OF THE INVENTION

The invention relates to a high voltage distribution substation that is hybrid, i.e. comprising both busbars and feeders using air-insulated technology, and also metal-clad break and switch modules comprising break and disconnector devices in metal cladding, the modules being used for interconnecting the busbars and the feeders.

As a preliminary point, it is worth enlarging on the concept of a "hybrid" high voltage substation since it is relatively recent. Air insulated technology is referred by the initials AIS (for air insulated system) and metal-clad technology by the initials GIS (for gas insulated system). The main desired objective is to reduce the ground area occupied by conventional substations (i.e. fully AIS substations), while nevertheless conserving both the advantages of AIS technology in terms of cost and ease of component replacement, and the advantages of GIS technology in terms of compactness and behavior relative to pollution. Hybrid substations can be installed as new facilities, but also as extensions to a conventional substation where the space available for an extension is limited.

A conventional substation having two sets of opposite busbars and feeders is shown in FIGS. 1, 1*a*, and 2. That type of substation occupies a large area on the ground firstly in the direction of the feeder bays (i.e. lengthwise) and secondly in the direction of the busbars (i.e. widthwise) because the feeders need to be opposite in offset bays. The switchgear belonging to a particular feeder must be located beneath both sets of busbars.

In order specifically to reduce the length of conventional substations, hybrid high voltage substations of the kinds shown diagrammatically in FIGS. 3 and 6 have been developed that use metal-clad breaking and switching modules for interconnecting the busbars and the feeders. Such known metal-clad modules are known, in particular from PCT application WO 00/24100 in which FIGS. 1 and 2 show single-phase modules for substations having single and double sets of busbars. In that technology, each feeder is associated with its own module, each module serving to connect one or two sets of busbars to a feeder. Thus, two opposite feeders use two modules and are necessarily located in two bays that are offset when the substation has more than one set of busbars. Compared with a conventional substation, that type of hybrid substation makes it possible to reduce the length of feeders, and thus the length of the substation, but does not make it possible to achieve any significant increase in the number of bays that can be installed in a given area. Furthermore, that technology does not make it possible to interconnect two opposite feeders directly when a module needs to be disconnected from a set of busbars due to an incident thereon.

SUMMARY OF THE INVENTION

The Applicant has devised a novel type of metal-clad module for making hybrid substations with facing opposite feeders, enabling manufacturing costs to be reduced and also making it possible to achieve a significant increase in the number of bays that can be installed in a given area compared with existing substations. A hybrid substation of the invention also makes it possible, if necessary, to perform a function of electrical connection between two opposite feeders.

To this end, the invention provides a "hybrid" high voltage multiphase distribution substation having one or more sets of busbars including at least one air-insulated set of busbars, the substation having feeders for air-insulated lines placed in substantially parallel bays on either side of the set(s) of busbars and including metal-clad breaking and switching modules each formed by metal cladding containing, for each electrical phase passing through a module, breaking and disconnection systems connected to a phase conductor in an insulating gas, an end disconnection system being placed at each of the two ends of a module, the substation being characterized in that the feeders are opposite in facing pairs, and in that two opposite feeders are electrically interconnected for each electrical phase via a single module when the break systems and the end disconnector systems of said module are closed, said end disconnector systems each being connected to a respective feeder.

In an embodiment of the invention, a single multiphase module electrically interconnects two opposite feeders. For example, for a three-phase substation, two opposite feeders are interconnected by a three-phase module having three phase conductors passing therethrough contained inside the metal cladding of said module and each connected to a respective overhead bushing at each end of the module.

In an embodiment of the invention, two opposite feeders of a substation convey a number n of electrical phases and are interconnected by n single-phase modules. For example, for a three-phase substation, two opposite feeders are interconnected by three single-phase modules each having a single-phase conductor passing therethrough and connected to an overhead bushing at each end.

In a preferred embodiment of the invention, the first and second feeders form aligned bays that are perpendicular to a set of busbars. For a substation having at least two sets of busbars, the two sets are generally parallel to each other and perpendicular to the feeders.

In an embodiment of the invention, each end disconnector system in the cladding of a module comprises, for each electrical phase, an end disconnector leading to an overhead bushing electrically connected to a feeder of the substation, and in which said end disconnectors are connected in series with two break systems comprising two circuit breakers themselves disposed on either side of one or two incoming disconnectors each leading to an overhead bushing electrically connected to a corresponding busbar of a set of busbars. The embodiment having a single incoming disconnector is particularly intended for installing the module in a substation having a single set of busbars where the incoming disconnector is generally referred to as the busbar disconnector.

In an embodiment of the invention, the substation has two sets of busbars and a breaking and switching module has two incoming disconnectors directly connected to each other by the phase conductor. The two incoming disconnectors are generally referred to as switching disconnectors.

In an embodiment of the invention, the substation has two sets of busbars and a breaking and switching module has two incoming disconnectors connected to each other by a separation disconnector in series with the phase conductor.

The invention also provides a breaking and switching module formed by metal cladding containing an insulating gas, and for each electrical phase: a first circuit breaker connected to a phase conductor passing through said module; each of the two ends of said module having an end disconnector per phase connected to an overhead bushing; an incoming disconnector being located between the circuit breaker and one of the end disconnectors; the module being characterized in that the cladding contains a second circuit breaker connected in series with the first circuit breaker in such a manner that the incoming disconnector is situated between the first and second circuit breakers. This type of module of the invention is intended in particular for hybrid substations having a single set of busbars and for H hybrid substations. The incoming disconnector of a module of the invention is generally referred to as the busbar disconnector. In most applications, it leads to an overhead bay, but it is also possible to have it lead to a box for sheathed cables or to a metal-clad line without going the ambit of the invention.

In an embodiment of the invention, the cladding of a module contains for each electrical phase a second incoming disconnector placed between the first and second circuit breakers. This embodiment is particularly intended for installing the module in a substation with two sets of busbars where the two incoming disconnectors are generally referred to as switching disconnectors. In a first embodiment of a module, the two incoming disconnectors are directly interconnected by the phase conductor. In a second embodiment, a separator disconnector in series with the phase conductor interconnects the two incoming disconnectors so as to make it possible to isolate the two symmetrical halves of the module from each other. The two sets of busbars in a substation of the invention can be entirely air-insulated (AIS) or it can comprise a combination of AIS and GIS, with a first set of busbars in air and a second set in metal cladding.

In another embodiment of a hybrid substation module of the invention, in particular intended for a "one-and-a-half breaker" configuration, two feeders and two sets of busbars are interconnected by a module comprising three circuit breakers in series, one circuit breaker being placed between the two disconnectors which are used as outgoing disconnectors leading to line feeders. Other substations of the "one-and-a-half breaker" type can be implemented by associating a two circuit breaker module of the invention with a conventional module having a single circuit breaker.

Optionally, at least one break or disconnection system for a module of the invention is placed in a compartment specific thereto within the cladding of the module, said compartment being isolated in leakproof manner from the adjacent compartments.

Optionally, a module of the invention has at least one current transformer disposed between an end disconnector and an overhead bay, and/or between an incoming disconnector and a circuit breaker.

BRIEF DESCRIPTION OF THE DRAWINGS

The invention, its characteristics, and its advantages are described in greater detail below with reference to the accompanying figures.

FIG. 3 is a perspective view of a prior art hybrid substation with two sets of busbars and in which the opposite feeders are in bays which are offset.

FIG. 3a is a theoretical electrical circuit diagram for a substation of the kind shown in FIG. 3.

FIG. 4 is a perspective view of a hybrid substation of the invention with two sets of busbars and a three-phase version of a module.

FIG. 4a is a theoretical electrical circuit diagram of a substation of the kind shown in FIG. 4.

FIG. 6 is a perspective view of a prior art hybrid substation with a single set of busbars and in which opposite feeders are in bays that are offset.

FIG. 6a is a theoretical electrical circuit diagram of a substation as shown in FIG. 6.

FIG. 6b is a perspective view of a conventional hybrid substation with a single set of busbars equivalent to that shown in FIG. 6, and with three individual modules each in the single-phase version.

FIG. 7 is a perspective view of a hybrid substation of the invention with a single set of busbars.

FIG. 7a is a theoretical electrical circuit diagram of a substation of the kind shown in FIG. 7.

FIG. 8 is a perspective view of a hybrid substation of the invention for a so-called H configuration.

FIG. 8a is a theoretical electrical circuit diagram of an H hybrid substation of the invention.

FIG. 9 is a perspective view of a conventional hybrid substation using a "one-and-a-half breaker" configuration.

FIG. 10 is a perspective view of a hybrid substation of the invention for a "one-and-a-half breaker" configuration.

FIG. 10a is a theoretical electrical circuit diagram of a "one-and-a-half breaker" type hybrid substation of the invention.

DETAILED DESCRIPTION OF THE INVENTION

Figure 1:
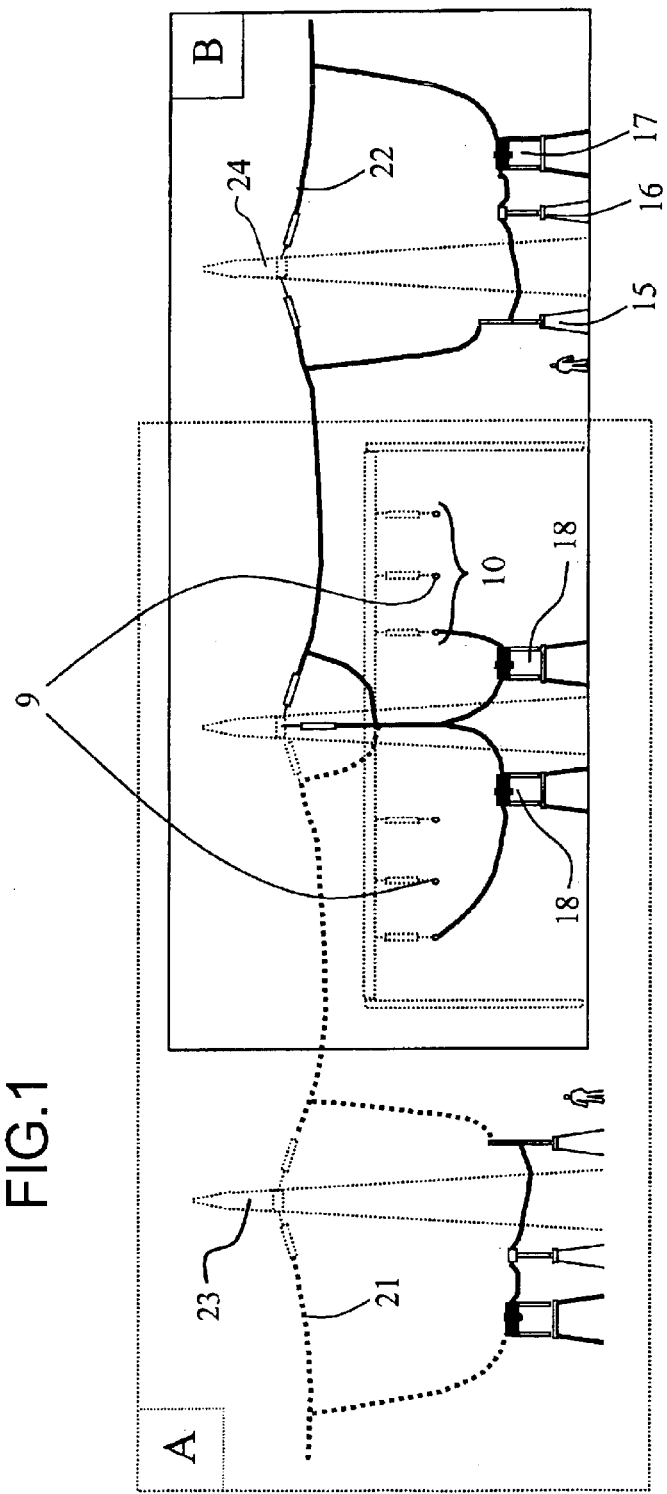
FIG. 1 shows a conventional substation with two sets of busbars and opposite feeders.

In FIG. 1, a conventional AIS substation is fitted with two sets of busbars 10 and two switching disconnectors 18 for each electrical phase in a bay 11 or 12, each switching disconnector being capable of connecting one phase of a feeder A or B to the same phase of a set of busbars 10 as conveyed by a particular busbar 9. A feeder typically comprises a series connection of AIS gear such as a circuit breaker 15, a current transformer 16, and a line grounding disconnector 17. The switching disconnectors 18 of a given feeder must be located beneath both sets of busbars 10, as can also be seen in FIG. 2, and they occupy a ground area approximately equal to the combined width of both sets of busbars. This implies that two opposite feeders A and B cannot be exactly side by side and thus that the bays 11 and 12 that they occupy must be offset in their length direction, i.e. transversely to the direction in which the busbars extend. A feeder A or B terminates in an electricity line 21 or 22 that is in line with its bay 11 or 12, the lines generally being supported by gantries 23 and 24 astride the feeders.

Figure 1A:
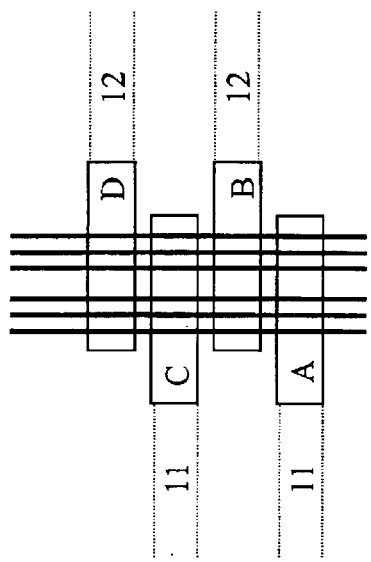
FIG. 1a is a diagram showing the way the feeders of a conventional substation as shown in FIG. 1 are offset.

FIG. 1*a* shows the lengthwise offset of the bays 11 and 12 for opposite feeders A, B, C, and D.

Figure 2:
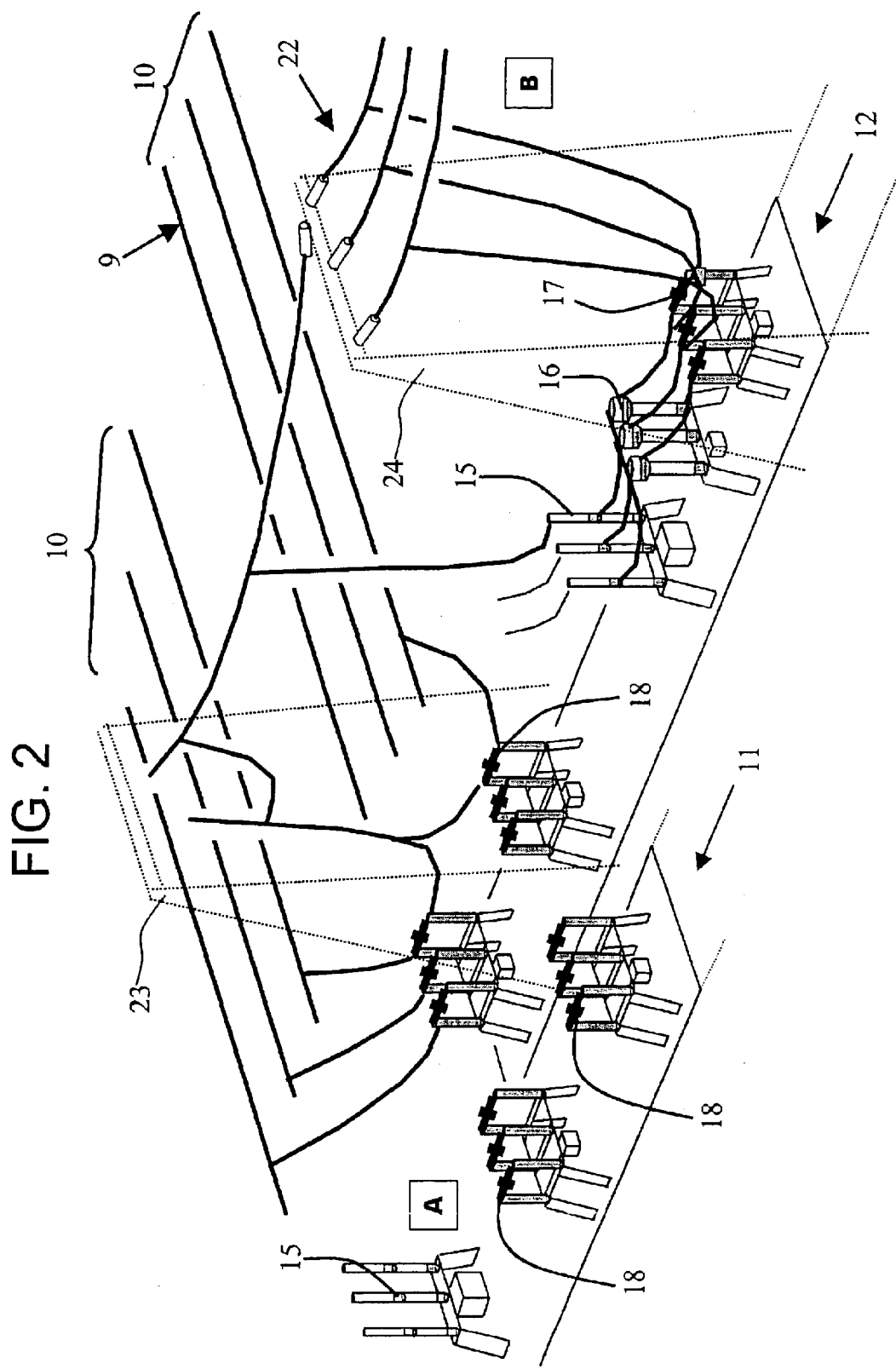
FIG. 2 is a perspective view of a conventional substation of the kind shown in FIG. 1.

In FIG. 2, the perspective view of a conventional substation shows more clearly how the bays 11 and 12 are offset lengthwise.

FIG. 3 is a diagrammatic perspective view of a prior art hybrid substation with two sets of busbars in which each feeder A or B is associated with a respective module 7A specific thereto. These modules 7A are known, in particular from PCT application WO 00/24100, and they are shown in their three-phase version in the figure, with three phase conductors 6 being contained within the metal cladding 8 of one module. To simplify the diagram, only one conductor 6 is drawn. The cladding 8 contains one circuit breaker 3 and three disconnectors 4 per phase with each disconnector leading to an overhead bushing 5. A first disconnector known as a line disconnector is connected to an electricity line 21 or 22 of a feeder A or B, while the other two disconnectors known as switching disconnectors are connected to respective busbars 9 of two sets of busbars 10.

Each module serves to connect one or the other of the two sets of busbars 10 to a feeder. Thus, two opposite feeders such as A and B or C and D use two modules that are disposed in two bays 11 and 12 that are necessarily offset lengthwise. This configuration having two modules for two opposite feeders makes it possible in particular to continue to feed a feeder even if the module belonging to the opposite feeder is out of service. Nevertheless, it does not make it possible to interconnect two opposite feeders directly in the event of it being necessary to disconnect a module from a set of busbars due to an incident thereon.

FIG. 3*a* is a circuit diagram of the hybrid substation shown in FIG. 3. The feeders B and D are assumed in this case to feed power transformers on lines 22. The line disconnectors are closed and are not shown, while the switching disconnectors are indeed shown between the two sets of busbars 10. It can be seen that two opposite feeders such as A and B or C and D cannot be directly interconnected. Nevertheless, by closing the switching disconnectors in an appropriate configuration, it is possible to feed one or the other of the two sets of busbars 10 by a live feeder A or C so as to feed the feeders B or D on the other side of the sets of busbars. Naturally such an indirect connection between opposite feeders cannot be established when the sets of busbars are unavailable.

FIG. 4 is a perspective view of a hybrid substation of the invention with two sets of busbars, and with a single three-phase module 1 interconnecting two opposite feeders such as A and B or C and D. Two opposite feeders form bays 11 and 12 that are in alignment, substantially perpendicularly to the two sets of busbars 10. The bays of successive opposite feeders are substantially parallel and facing, and they thus occupy an area whose depth dimension is approximately half that required by the same number of feeders in a conventional hybrid substation as shown in FIG. 3. As in a conventional AIS substation or a conventional hybrid substation, a feeder A or B is connected to an electricity line 21 or 22 in line with its own bay 11 or 12, and the lines 21 and 22 are carried in general by gantries 23 and 24 placed astride the feeders. Because the opposite feeders A and B are facing, the hybrid substation of the invention has lines 21 and 22 in alignment.

The module 1 shown has three phase conductors 6 contained in metal cladding 2. To simplify the drawing, only one conductor 6 is shown as in FIG. 3. As for conventional hybrid substation modules, a module for a hybrid substation of the invention is essentially formed by generally tubular metal cladding having respective end disconnectors 4A and 4B at opposite ends 13 and 14 leading via corresponding overhead bushings 5A or 5B that convey electricity in and out of the module to overhead lines.

A feature of the invention is that the overhead bushings 5A or 5B at each of the ends of a module are all connected to a line 21 or 22 of opposite feeders such as A and B, e.g. by means of cables.

In the substation with two sets of busbars shown in FIG. 4, a module 1 has, per phase, two circuit breakers 3A and 3B connected in series by a phase conductor 6, and also two incoming disconnectors 4M, also known as switching disconnectors. The two switching disconnectors 4M make it possible to switch the load of one and/or the other of the two sets of busbars to one and/or the other of the two opposite feeders, and vice versa. Each switching disconnector is connected to a branch from the phase conductor 6 situated between the two circuit breakers 3A and 3B, and it is connected to a corresponding set of busbars 10 via overhead bushings 5M.

The circuit diagram of the substation with two sets of busbars provides an advantage in terms of supply availability over the circuit with only one set of busbars. In the event of one of the sets of busbars being unavailable, the switching disconnector 4M connected thereto is left open while its neighbor connected to the available set of busbars is closed. One and/or the other of the opposite feeders can then again be fed via the available set of busbars.

In a preferred embodiment, each switching disconnector is contained in a compartment that is isolated in leakproof manner from the other compartments within the cladding of the module, and the two adjacent switching disconnectors 4M are separated from each other by a leakproof partition constituted in conventional manner by a cone of electrically insulating material. This embodiment presents the advantage of conserving the availability of one set of busbars in the event of a fault in the switching disconnector compartment that is connected to the other set of busbars. Putting switching disconnectors into compartments makes it possible to avoid a fault on one disconnector in a first compartment propagating to the other disconnector situated in an adjacent second compartment that is isolated therefrom. The voltage rating of the open switching disconnector situated in the good compartment is therefore unaffected, and the set of busbars connected to said second compartment can thus be kept live without requiring the cables connecting it to the module to be disconnected. Only the set of busbars connected to the damaged first compartment needs to be taken out of service.

In addition, in a hybrid substation of the invention operating in a degraded mode can feed a feeder from the line of the opposite feeder even when both sets of busbars are unavailable. The module of the invention makes it possible to establish an electrical connection between two opposite feeders by closing the two circuit breakers 3A and 3B and the two end disconnectors 4A and 4B.

FIG. 4*a* is a theoretical embodiment circuit diagram of the substation shown in FIG. 4. As in FIG. 3*a*, the line disconnectors are assumed to be closed and only the switching disconnectors are shown. It can clearly be seen that two opposite lines can be directly interconnected phase to phase via the phase conductors of a module, by closing the circuit breakers and the line disconnectors of the module. Compared with FIG. 3a, it is clear that the opposite feeders occupy an area that is reduced by about half.

Figure 5:
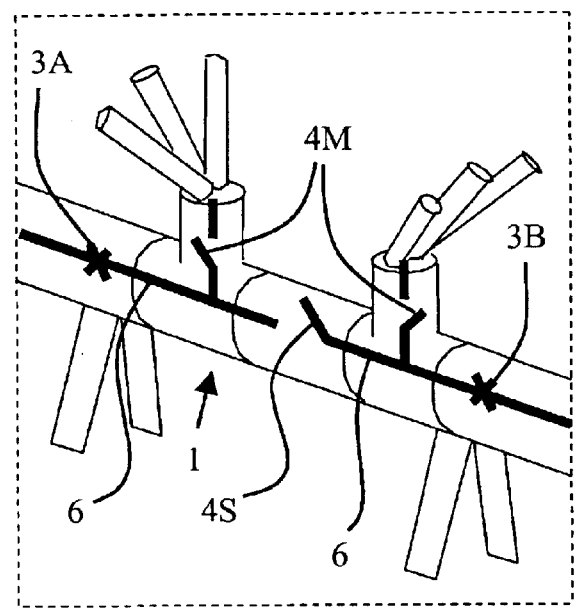
FIG. 5 is a fragmentary view of a variant module for a hybrid substation with two sets of busbars as shown in FIG. 4.

FIG. 5 is a diagram of a variant of the module 1 of FIG. 4 in which a separating disconnector 4S is connected in series in the phase conductor 6 for each of the electrical phases interconnecting the two switching disconnectors 4M. Opening the separation disconnector 4S enables each feeder to be switched to the set of busbars on its own side independently of the opposite feeder. Furthermore, maintenance can be performed on one-half of the module, e.g. on the circuit breaker 3B or the disconnector 4B while keeping the other half of the module (circuit breaker 3A and disconnector 4A) in operation, providing a temporary or permanent grounding device (not shown in the Figure) is provided. Advantageously, the switching disconnectors can be compartmented to make it possible in the event of a fault in one compartment to empty that compartment of the dielectric gas it contains and to keep the separation disconnector open in its isolated compartment without interfering with the operation of the gear situated in the good half of the module.

The variant with a separation disconnector thus provides increased operating flexibility. It can be observed that operating flexibility is not always total, unlike the conventional substation shown in FIG. 3, since each feeder cannot be switched independently to the set of busbars on the opposite side.

Figure 5A:
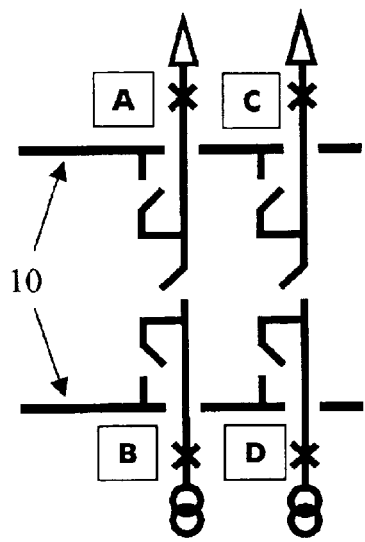
FIG. 5a is a theoretical electrical circuit diagram of a substation using a module of the kind shown in FIG. 5.

FIG. 5a is a theoretical electrical circuit diagram similar to that of the substation shown in FIG. 4 but further including a separation disconnector in each phase in a module 1, as shown in FIG. 5. When the separation disconnectors are open, the substation operates as two symmetrical independent substations.

Figure 5B:
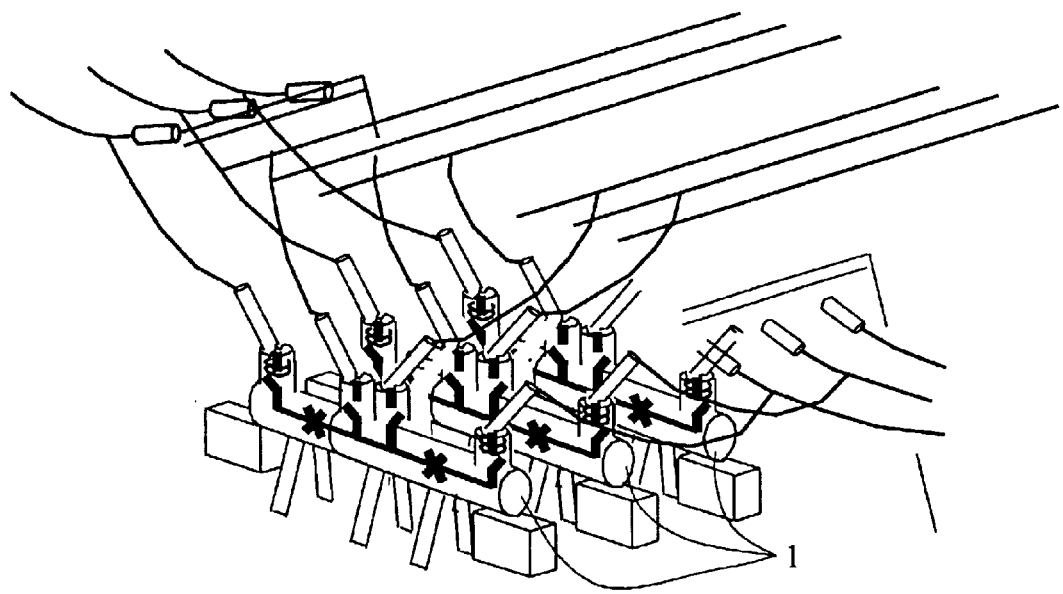
FIG. 5b is a perspective view of a hybrid substation of the invention with two sets of busbars equivalent to that shown in FIG. 4, but with three individual modules each in a single-phase version.

FIG. 5b, is a perspective view of a hybrid substation of the invention with two sets of busbars and with three individual modules 1 each constituted by a single-phase version for interconnecting two opposite feeders such as A and B or C and D. This substation is functionally equivalent to that shown in FIG. 4 and it provides advantages in terms of fault isolation and maintenance. Nevertheless, the ground area occupied along the direction in which the busbars extend can be slightly greater than that occupied by a three-phase module because of the volume occupied by each individual module.

FIG. 6 is a perspective view of a prior art hybrid substation with a single set of busbars in which opposite feeders A and B occupy bays 11 and 12 that are slightly offset. This substation makes use of one three-phase module per feeder which comprises, for each phase, a circuit breaker 3 connected at each end of the module to a disconnector 4. The modules of the opposite feeders are located in this case in bays that are offset, but it is possible to place the bays in line, as shown in FIG. 6b.

FIG. 6a is a theoretical electrical circuit diagram of the substation with a single set of busbars shown in FIG. 6, in which the opposite feeders A and B are offset. It is nevertheless possible for conventional hybrid substations with a single set of busbars to place the modules for opposite feeders in line.

FIG. 6b is a perspective view of a conventional hybrid substation with a single set of busbars equivalent to that shown in FIG. 6 but using three individual single-phase modules for each feeder. In this case, the modules of the opposite feeders are disposed in line, with the busbar disconnectors of two opposite modules being allocated to the same phase and being connected via cables to a busbar 9 corresponding to said phase, the cables being connected to the busbar at a common connection point 25. That type of substation does not enable two feeders to be directly interconnected in the event of the set of busbars being unavailable unless the cables connected to the common connection point 25 are disconnected and the opposite busbar disconnectors are themselves interconnected, which involves a difficult intervention.

FIG. 7 is a perspective view of a hybrid substation of the invention with a single set of busbars and in which two opposite feeders A and B are interconnected via a single three-phase module 1 and form bays 11 and 12 that are in alignment. Like a substation with two sets of busbars, the module 1 comprises, per phase, two circuit breakers 3A and 3B in series located between two end disconnectors 4A and 4B each connected to a feeder A or B. But because there is only one set of busbars 10, this module 1 has only one incoming disconnector 4M per phase which is also referred to as a busbar disconnector, serving to connect the set of busbars 10 to the phase conductors 6 at a point between the two circuit breakers. When the busbar disconnector 4M is open, it is possible to interconnect two opposite feeders directly in the event of the set of busbars being unavailable. The theoretical electrical circuit diagram for this substation is given in FIG. 7a.

FIG. 8 is a perspective view of a hybrid substation of the invention in a so-called H configuration and a conventional circuit diagram for the H configuration is given in FIG. 8a. The modules 1 used in this H substation, and the disposition of the opposite feeders such as A and B or C and D are similar to the configuration for a hybrid substation of the invention having a single set of busbars. The incoming disconnectors 4M or busbar disconnectors of two modules side by side are interconnected by cables of the set of busbars 20, which cables can be manually disconnected from the overhead bushings 5M supporting them. When all of the cables constituting the set of busbars 20 are connected, as shown in dotted lines in the Figure, the electrical connection is equivalent to that of a single set of busbars. The H configuration amounts to concentrating on two opposite pairs of feeders in the substation, with each pair being connected in this case by means of a module 1 to the cables of the set of busbars 20 extending between the incoming disconnectors 4M of the two modules. The resulting unit is H-shaped, as can be seen in FIG. 8a.

In conventional manner, a line L1 or L2 of an H substation is always associated with a power transformer such as T1 or T2. The incoming disconnectors 4M are open in normal operation. If a fault occurs, for example, on the line L1, then the circuit breaker 3A and the disconnector 4A at the end of the module connected to L1 are opened so as to isolate the upstream and downstream portions of the line. The circuit breaker 3B and the disconnector 4B are closed downstream, and the incoming disconnectors 4M are also closed so that the transformer T1 becomes fed by the line L2 at the same time as it feeds the transformer T2. H substations can be operated in other known ways that are not described in the present specification. The invention naturally does not apply to the H configuration per se, but to an H-configuration hybrid substation using a module 1 of the invention.

FIG. 9 is a perspective view of a conventional hybrid substation in a "one-and-a-half breaker" configuration. Two line feeders L1 and L2 and two sets of busbars 10 are interconnected by three conventional metal-clad modules 7B placed in alignment and electrically connected in series, each module 7B being constituted by a circuit breaker 3 contained in metal cladding and having a disconnector 4 at each end and for each electrical phase which is connected to an overhead bushing. Two adjacent modules are connected in series by cables interconnecting their overhead bushings and also connected to a feeder for line L1 or L2. The principle on which a "one-and-a-half breaker" substation operates can be summarized as follows:

In normal operation all of the circuit breakers are closed.

In the event of a fault on one set of busbars, that set of busbars can be isolated without losing feed to the line feeders, feed being maintained by the good set of busbars, and electricity flowing via two of the three circuit breakers.

FIG. 10 is a perspective view of a hybrid substation of the invention in a "one-and-a-half breaker" configuration using a single breaking and switching module 1 for connecting a set of busbars 10 to two line feeders L1 and L2. For each electrical phase, the module 1 has three circuit breakers 3A, 3B, and 3C connected in series by a phase conductor 6. Two incoming disconnectors 4M are connected between respective pairs of adjacent circuit breakers and are used in this "one-and-a-half breaker" configuration as outgoing disconnectors leading to the line feeders L1 and L2.

FIG. 10a is a theoretical electrical theoretical circuit diagram for a "one-and-a-half breaker" substation as shown in FIG. 10.

Figure 11:
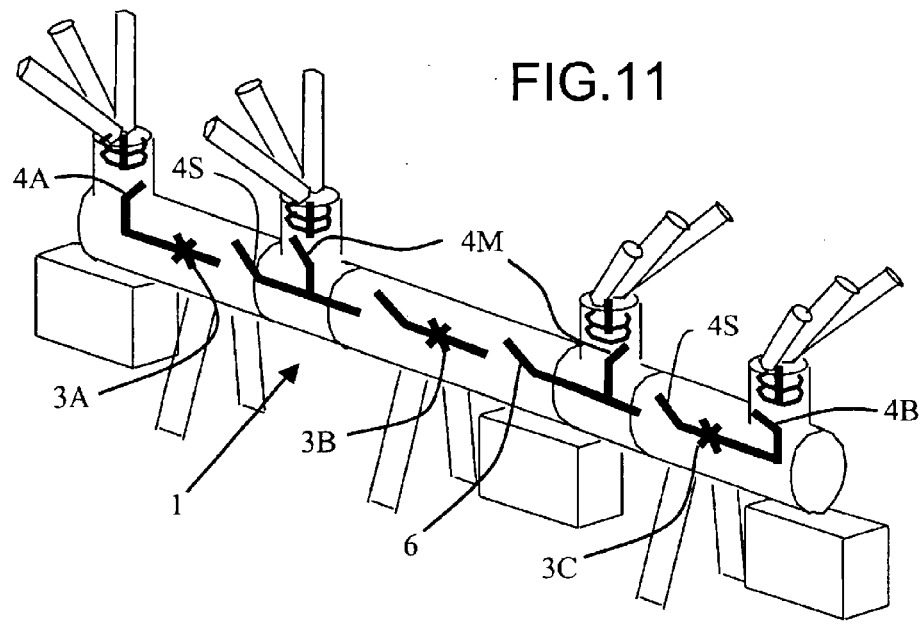
FIG. 11 is a perspective view of a variant module for a "one-and-a-half breaker" type hybrid substation of the kind shown in FIG. 10.

In FIG. 11, the module 1 shown in FIG. 10 is associated with two series-connected disconnectors 4S for each phase in the phase conductor 6 so as to enable each circuit breaker 3A, 3B, or 3C to be isolated from its neighbors by opening one or more disconnectors 4S.

This makes it possible to provide a hybrid substation of the invention in a "one-and-a-half breaker" configuration by using a two-circuit breaker module 1 of the invention associated with a conventional single-circuit breaker module 7B. The module 1 is of the type used in a hybrid substation of the invention with a single set of busbars, the incoming disconnector 4M being connected to a line feeder of any kind (air-insulated, metal-clad, sheathed cable, etc.).

Figure 12:
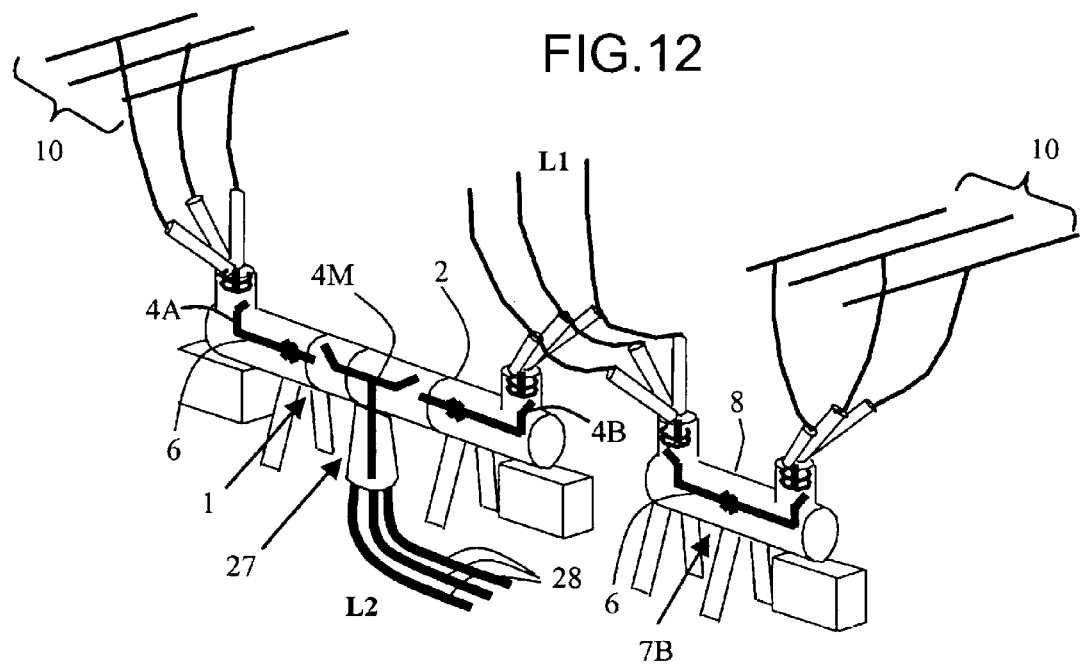
FIG. 12 is a perspective view of a hybrid substation of the invention in a "one-and-a-half breaker" configuration using a module of the invention in association with a conventional module.

FIG. 12 is perspective view of such a hybrid substation with a module 1 whose incoming disconnector 4M constitutes a disconnection system connected to underground line feeder L2. This disconnector system 4M is constituted, for each phase, by two adjacent disconnectors connected in series with the phase conductor 6 and co-operating therewith to form a T-branch leading to a portion 27 that projects from the metal cladding 2. This projecting portion 27 is designed to enable phase conductor 6 to be connected to a cable 28 which is insulated by means of a sheath, it being possible to install a cable box outside the cladding in line with said projecting portion. One end disconnector 4A of the module 1 is connected to a first set of busbars 10 and the other end disconnector 4B is connected to a line feeder L1 and to a first disconnector of a conventional module 7B whose second disconnector is connected to a second set of busbars 10.

The modules used in a hybrid substation of the invention can present various types of connection to the disconnectors, depending on the types of busbar and feeder used in the substation. The hybrid substation shown in FIG. 4 has two sets of air-insulated busbars 10 and the incoming disconnectors 4M thus lead to overhead bushings 5M. A hybrid substation of the invention with two sets of busbars can also be implemented in combined AIS/GIS manner having a first set of busbars in air and a second set of busbars in metal cladding, in which case one of the two incoming disconnectors 4M leads to a connection with the metal cladding of a metal-clad set of busbars.

Figure 13:
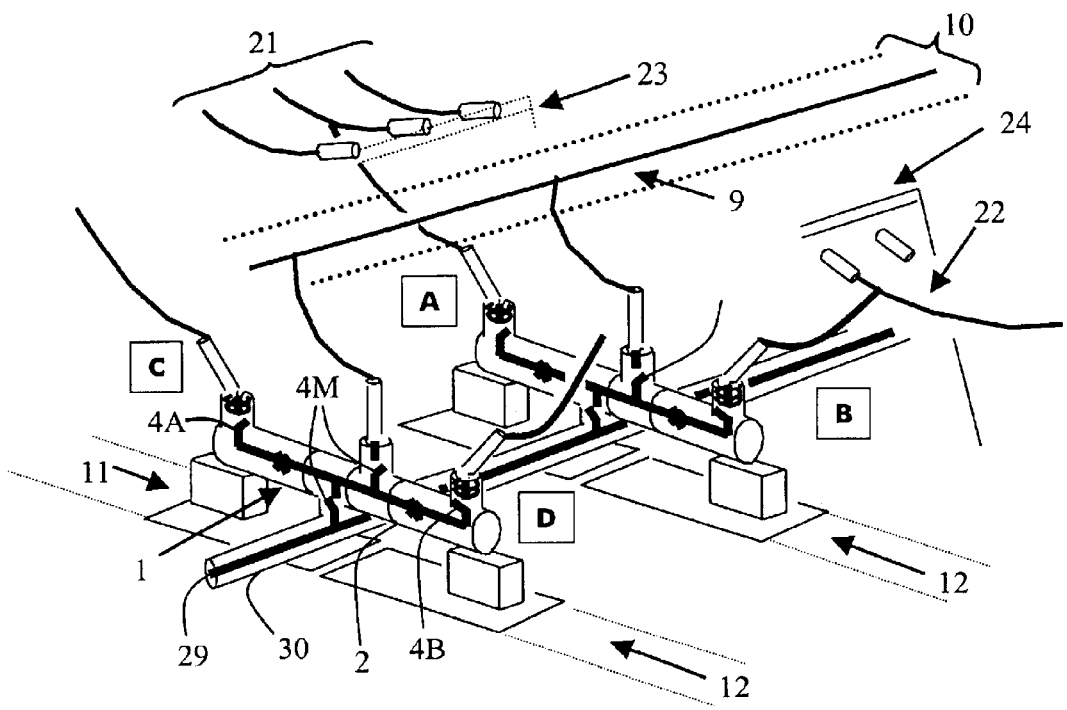
FIG. 13 is a perspective view of a hybrid substation of the invention having two sets of busbars: an AIS set and a GIS set.

FIG. 13 shows one phase of such a substation using combined AIS and GIS on two sets of busbars together with the single-phase version of the gear, a single-phase module 1 interconnecting two opposite feeders such as A and B or C and D for each phase. The cladding 2 of a module is connected via an incoming disconnector 4M to the cladding 30 containing one of the busbars 29 of a set of metal-clad busbars. The volume of the cladding 30 can communicate with the cladding 2 or it can be isolated therefrom by a leakproof partition at one end of the incoming disconnector 4M.

The modules used in a hybrid substation of the invention with two sets of busbars are shown in the preceding figures with two switching disconnectors 4M each constituted by a single disconnector element. The invention also covers a variant embodiment of the module in which each switching disconnector 4M comprises a disconnection system constituted by two disconnector elements connected in series with the phase conductor inside the cladding of a module and forming a T-branch connection to the inlet of the incoming disconnector. This configuration applies firstly to an air-insulated substation having two sets of busbars, but it can also be applied to two sets of combined AIS and GIS busbars providing a T-branch is arranged to lead to a set of metal-clad busbars.

Figure 14:
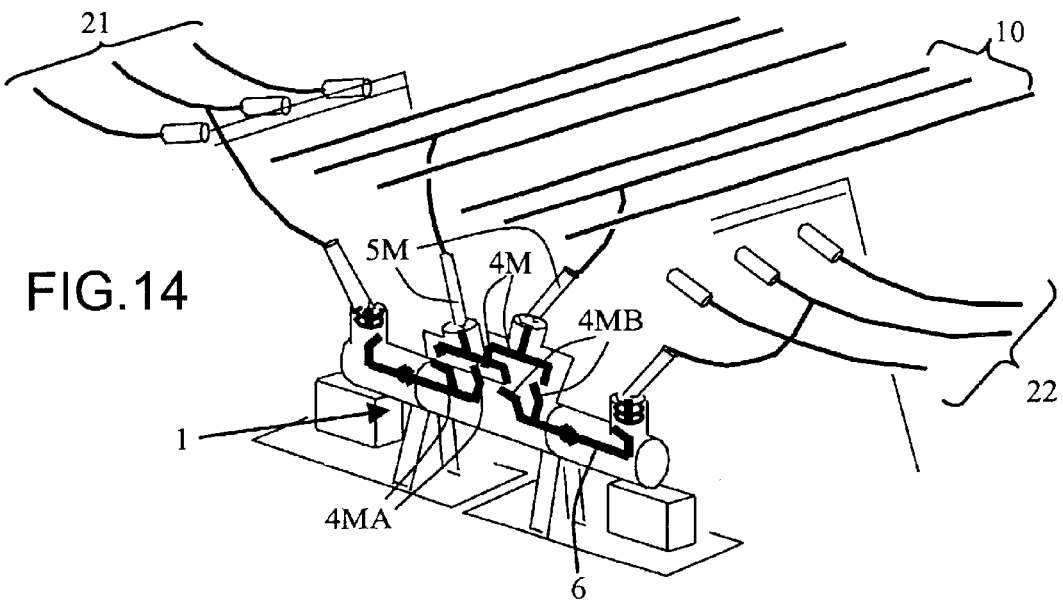
FIG. 14 shows one electrical phase of a variant module of the invention for a substation with two sets of busbars in which the switching disconnectors are placed in parallel.

FIG. 14 shows one phase of a single-phase version of such an embodiment for an air-insulated substation with two sets of busbars in which each switching disconnector 4M is constituted by two disconnector elements 4MA and 4MB forming a T-branch, with the two branches being connected in parallel in the module 1 and each leading to an overhead bushing 5M connecting the module to the corresponding phase of one of the two sets of busbars. This configuration using parallel switching disconnectors provides total operating flexibility like that of a conventional hybrid substation as shown in FIG. 3 since each feeder can be switched independently to one or the other of the two sets of busbars. In comparison, substations of the invention as shown in FIG. 4 or 5 do not provide this total flexibility.

What is claimed is:

1. A "hybrid" high voltage multiphase distribution substation having one or more sets of busbars including at least one air-insulated set of busbars (10), the substation having feeders (A, B, C, D) for air-insulated lines (21, 22) placed in substantially parallel bays (11, 12) on either side of the set(s) of busbars (10) and including metal-clad breaking and switching modules each formed by metal cladding (2) containing, for each electrical phase passing through a module, breaking and disconnection systems connected to a phase conductor (6) in an insulating gas, an end disconnection system (4A, 4B) being placed at each of the two ends (13, 14) of a module, the substation being characterized in that the feeders are opposite in facing pairs, and in that two opposite feeders (A, B) are electrically interconnected for each electrical phase via a single module (1) when the break systems (3A, 3B, 3C) and the end disconnector systems (4A, 4B) of said module are closed, said end disconnector systems each being connected to a respective feeder (A, B).

2. A multiphase distribution substation according to claim 1, in which a single multiphase module (1) electrically interconnects two opposite feeders (A, B).

3. A multiphase distribution substation according to claim 1, conveying a number n of electrical phases, in which two opposite feeders (A, B) are interconnected by n single-phase modules (1).

4. A substation according to claim 1, in which the first (A, C) and second (B, D) feeders form aligned bays (11, 12) that are perpendicular to a set of busbars (10).

5. A substation according to claim 1, in which each end disconnector system in the cladding (2) of a module (1) comprises, for each electrical phase, an end disconnector (4A, 4B) leading to an overhead bushing (5A, 5B) electrically connected to a feeder (A, B) of the substation, and in which said end disconnectors (4A, 4B) are connected in series with two break systems comprising two circuit breakers (3A, 3B) themselves disposed on either side of one or two incoming disconnectors (4M) each leading to an overhead bushing (5M) electrically connected to a corresponding busbar (9) of a set of busbars (10).

6. A substation according to claim 5, in which the substation has two sets of busbars (10) and in which a breaking and switching module (1) has two incoming disconnectors (4M) directly connected to each other by the phase conductor (6).

7. A substation according to claim 5, in which the substation has two sets of busbars (10) and in which a breaking and switching module (1) has two incoming disconnectors (4M) connected to each other by a separation disconnector (4S) in series with the phase conductor (6).

8. A breaking and switching module formed by metal cladding (2) containing an insulating gas, and for each electrical phase: a first circuit breaker (3A) connected to a phase conductor (6) passing through said module; each of the two ends (13, 14) of said module having an end disconnector (4A, 4B) per phase connected to an overhead bushing (5A, 5B); an incoming disconnector (4M) being located between the circuit breaker (3A) and one of the end disconnectors; the module being characterized in that the cladding (2) contains a second circuit breaker (3B) connected in series with the first circuit breaker (3A) in such a manner that the incoming disconnector (4M) is situated between the first and second circuit breakers (3A, 3B).

9. A module according to claim 8, in which the incoming disconnector (4M) is connected to an overhead bushing (5M).

10. A module according to claim 8, in which the incoming disconnector (4M) comprises a disconnection system constituted for each phase, by two adjacent disconnectors connected in series with the phase conductor (6) and forming a T-branch therewith leading to a projecting portion (27) of the cladding (2), and in which the projecting portion is designed to connect each phase conductor (6) to a cable (28) that is insulated by a sheath outside the cladding.

11. A module according to claim 9, in which the cladding (2) contains, for each electrical phase, a second incoming disconnector (4M) disposed between the first and second circuit breakers (3A, 3B).

12. A module according to claim 11, in which the two incoming disconnectors (4M) are directly interconnected by the phase conductor (6).

13. A module according to claim 11, in which a separation disconnector (4S) in series with the phase conductor (6) interconnects the two incoming disconnectors (4M).

14. A module according to claim 11, in which each incoming disconnector (4M) is constituted by a disconnection system comprising two disconnector elements (4MA, 4MB) connected in series with the phase conductor (6) inside the cladding of the module and forming a T-branch at the inlet of said disconnection system.

15. A module according to claim 11, in which the incoming disconnector (4M) leads outside the cladding (2) of the module to metal cladding (30) containing at least one phase conductor (29) in an insulating gas.

16. A module according to claim 12, in which a third circuit breaker (3C) is placed between the two incoming disconnectors (4M) in series with the first and second circuit breakers (3A, 3B).

17. A module according to claim 16, in which the disconnectors (4S) in series with the phase conductor (6) make it possible to isolate each of the circuit breakers (3A, 3B, 3C) electrically from its neighbors.

18. A module according to claim 8, in which at least one circuit breaker or disconnector is placed in a compartment specific thereto inside the cladding (2) of the module, said compartment being isolated in leakproof manner from the adjacent compartments.

19. A module according to claim 8, including at least one current transformer (19) disposed between an end disconnector (4A, 4B) and an overhead bushing (5A, 5B), or between an incoming disconnector and a circuit breaker.

20. A "hybrid" high voltage multiphase distribution substation of the one-and-a-half breaker type, the substation comprising two sets of air-insulated busbars (10) and two feeders for lines (L1, L2) at least one of which is air-insulated, the substation including metal-clad breaking and switching modules (1, 7B) each formed by metal cladding (2, 8) containing, for each electrical phase passing through a module, breaking and disconnection systems connected to one phase conductor (6) in an insulating gas, an end disconnection system (4A, 4B) being placed at each of the two ends (13, 14) of a module, the substation being characterized in that at least one of the sets of busbars (10) is capable of feeding both line feeders via a single breaking and switching module (1) as defined in claim 9.

21. A "hybrid" high voltage multiphase distribution substation of the H-type comprising opposite pairs of air-insulated feeders (A and B, C and D) each connected to an electricity line (L1, L2), the substation being characterized in that the opposite feeders (A and B, C and D) of each line are electrically interconnected by a single module (1) as defined in claim 8, and in that the overhead bushings (5M) connected to an incoming disconnector (4M) of a module (1) can be electrically connected phase by phase to corresponding overhead bushings situated on the adjacent modules.

* * * * *